United States Patent [19]

Mercier et al.

[11] Patent Number: 4,729,870

[45] Date of Patent: Mar. 8, 1988

[54] FUEL ELEMENT FOR A NUCLEAR REACTOR

[75] Inventors: Claude Mercier; Marcel Mabboux, both of Manosque, France

[73] Assignee: Commissariat a l'Energie Atomique, Paris, France

[21] Appl. No.: 923,155

[22] PCT Filed: Jan. 23, 1986

[86] PCT No.: PCT/FR86/00021
§ 371 Date: Oct. 14, 1986
§ 102(e) Date: Oct. 14, 1986

[87] PCT Pub. No.: WO86/04728
PCT Pub. Date: Aug. 14, 1986

[30] Foreign Application Priority Data

Feb. 12, 1985 [FR] France ................................ 85 01950

[51] Int. Cl.$^4$ ............................................. G21C 3/10
[52] U.S. Cl. ..................................... 376/451; 376/204
[58] Field of Search ................ 376/451, 204; 122/364

[56] References Cited

U.S. PATENT DOCUMENTS 3,079,322  2/1963  Stockdale ........................... 376/451
3,392,438  7/1968  Coulter ............................... 376/451
4,587,094  5/1986  Bucker ................................ 376/451
4,591,068  5/1986  Tolind ................................ 376/204
4,657,733  4/1987  Millot ................................ 376/451

FOREIGN PATENT DOCUMENTS

A813301   7/1951  Fed. Rep. of Germany .
A1550653 12/1968  France .
A2321428  3/1977  France .
A7702531  9/1978  Netherlands .

Primary Examiner—Donald P. Walsh
Attorney, Agent, or Firm—Oblon, Fisher, Spivak, McClelland & Maier

[57] ABSTRACT

The nuclear fuel element according to the invention comprises a can, which is sealed at its ends by plugs, whereof a cylindrical portion is force fitted into the can. The internal diameter of the can can vary between a maximum diameter and a minimum diameter, the diameter of the cylindrical portion being equal to said minimum diameter. Three serrations machined on the cylindrical portion form beads, whose thickness is equal to half the difference between the maximum diameter and the minimum diameter of the can.

2 Claims, 3 Drawing Figures

FUEL ELEMENT FOR A NUCLEAR REACTOR

BACKGROUND OF THE INVENTION

The present invention relates to a nuclear fuel element for use in a nuclear reactor, preferably of the fast neutron type.

The nuclear fuel elements used in fast neutron reactors are generally in the form of rods, which are then brought together in bundles or groups in nuclear fuel assemblies constituting the fissile part of the reactor core.

Each nuclear fuel rod essentially comprises a tubular metal can or jacket, in which are stacked fissile material pellets constituting the actual fuel. The can is sealed at each of its ends by a plug, which is forced into the interior of the can and then welded level with the junction plane between plug and can.

Due to the tolerances inherent in the manufacture of tubular cans, the internal diameter thereof can vary by approximately 1/100 mm within the same production batch and by approximately 6/100 mm in different production batches.

To take account of these tolerances, the presently used plug fitting process consists firstly of pairing the plugs as a function of the internal diameter of the cans. When this pairing has taken place, the plugs are fitted into the cans with a force of approximately 80 daN for an average tightening of 2/100 mm, prior to being welding.

However, despite the precautions taken, there are still mixtures of cans obtained from different batches or non-conforming parts, which often makes it necessary for manufacturers to manually complete the plugging operation using a hammer and the elimination of plugs which do not hold in the cans. This leads to a very low working speed and to considerable wastage at the production stage.

Moreover, the approximate nature of the tightening between the plugs and the can often leads to excessive tightening, which can cause an abnormal swelling of the can and to a pulling away of metal, which often leads to defects in the welded area. This is another cause of wastage when these are latent defects. Among these defects, reference can be made to the plastic deformation of the bearing face during the stopping of the upper plug leading to a flattening which is prejudicial to the fitting of the lower plug and to the quality of its weld. A deformation at the weld of the lower plug also causes problems for fitting the rod bundles within the assemblies. Moreover, excessive tightening of the plugs in the can can lead to buckling of the latter, bearing in mind the considerable difference between its diameter and its length.

A consequence of all these difficulties is that it is not possible with the present technology to envisage an automation of the production of nuclear fuel elements.

SUMMARY OF THE INVENTION

The main object of the invention is to permit a high speed automatic production of nuclear fuel elements. To this end, a nuclear fuel element is proposed, whose plugs are produced in such a way that the fitting force is limited to a minimum value, so as to avoid any deformation, whilst still ensuring a good hold of the plug, without it being necessary to pair plugs and cans and whilst completely guarantying the conformity of fitting, the defects referred to herein before being eliminated.

The present invention therefore specifically relates to a nuclear fuel element comprising a tubular can having an internal diameter between a maximum diameter and a minimum diameter, which is sealed at at least one end by a plug having a cylindrical portion force fitted into said can, wherein the cylindrical portion has a diameter equal to the minimum diameter of the can and has at least three serrations oriented in accordance with the generatrixes of said cylindrical portion and which are regularly spaced, said serrations forming overhanging beads with respect to said cylindrical portion over a thickness equal to half the difference between the maximum diameter and the minimum diameter of the can.

Preferably, only three serrations are formed on the cylindrical portion of the plug, whilst the driving in force is reduced to a very low value of approximately 15 daN.

BRIEF DESCRIPTION OF THE DRAWINGS

The invention is described in greater detail hereinafter relative to a non-limitative embodiment and the attached drawings, wherein show.

DETAILED DESCRIPTION OF THE INVENTION

Figure 1:
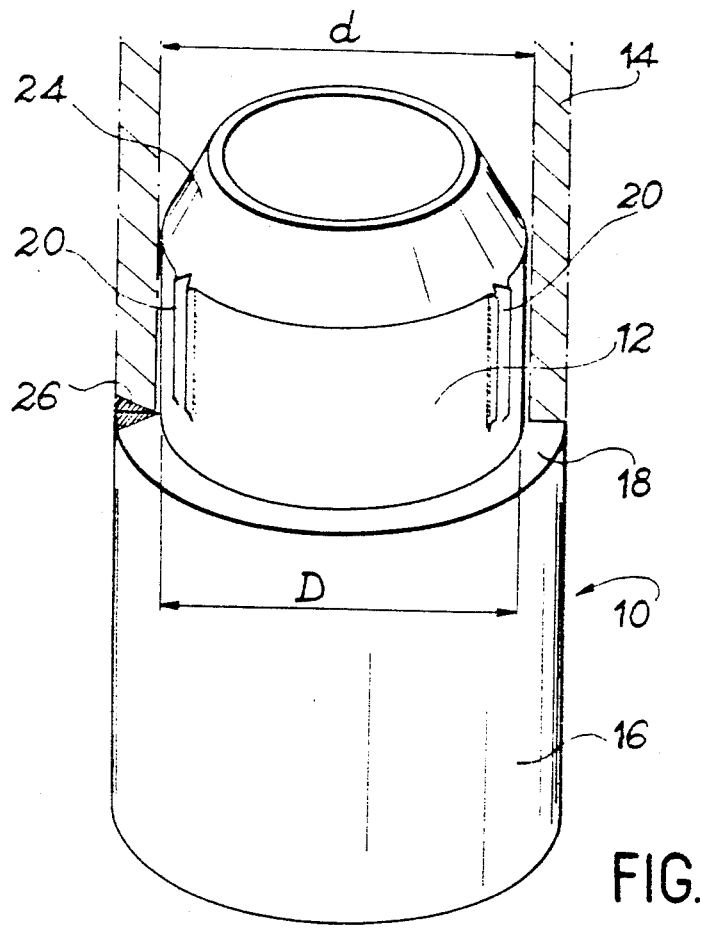
FIG. 1, a perspective view showing a plug produced according to the invention and fitted into a can, whose end is represented in longitudinal section and mixed line form.

As is shown by FIG. 1, the plug 10 according to the invention is a solid metal cylindrical part having a small diameter cylindrical portion 12 fitting into the end of the tubular can 14 and a large diameter cylindrical portion 16, separated from portion 12 by a shoulder 18, which abuts against the end of can 14. As illustrated in FIG. 1, the external diameter of plug portion 16 is substantially equal to the external diameter of can 14.

According to the invention, cylindrical portion 12 is designed in such a way that it can be fitted into can 14 by using a minimum force of approximately 15 daN, tightening being obtained by the elastic deformation of the can, which makes it possible to ensure the securing of the plug under optimum conditions prior to the carrying out of a good quality weld without filling metal.

To this end, fig shows that the external diameter D of the cylindrical portion 12 is slightly smaller than the internal diameter d of the can. Three serrations 20 at 120° from one another are formed on said cylindrical portion 12 according to the generatrixes thereof.

Figure 2:
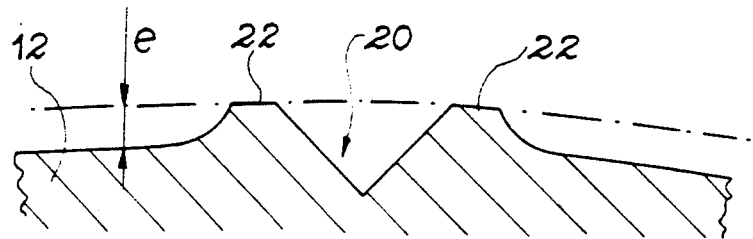
FIG. 2, a section representing on a large scale one of the serrations formed on the cylindrical portion of the plug of FIG. 1.

As is more particularly illustrated by FIG. 2, each of the serrations 20 forms two beads 22, whereof the thickness e overhanging with respect to the norminal diameter D of the cylindrical portion 12 slightly exceeds (by approximately 1/100 mm)

$$\frac{d-D}{2},$$

so that the fitting of portion 12 into can 14 leads to a local elastic deformation of the interior of the can and the beads 22 adequate for ensuring the desired tightening.

In known manner, the fitting of plug 16 into can 14 is facilitated by the bevelled shape of end 24 of cylindrical portion 12. When fitting has been completed, plug 16 and can 14 are welded at 26, without filler metal, along their respective junction plane.

As can 14 is produced in successive batches, its internal diameter d can vary by a few hundreths of a mm between a maximum diameter $d_{max}$ and a minimum diameter $d_{min}$. The diameter D of the cylindrical plug portion 12 is preferably chosen equal to the minimum diameter $d_{min}$ and the thickness e of the beads 22 formed by the serrations 20 is equal to $$\frac{d_{max} - d_{min}}{2}.$$

In the case of mass production from cans having an internal diameter varying between certain known limits, it is possible to ensure an automated fitting of the plugs into the cans with substantially no wastage and under tightening conditions very close to the ideal tightening of approximately 1/100 mmm for which all the defects observed with the prior art are eliminated.

It should be noted that the number of serrations 20 formed on the cylindrical portion 12 of the plug can exceed 3. However, the fitting force of the plug rapidly increases with the number of serrations. Thus, whereas this force is 15 daN when three serrations are formed on the cylindrical portion 12 of a given plug, it increases to 30 daN if the cylindrical portion 12 of said plug had four serrations.

Figure 3:
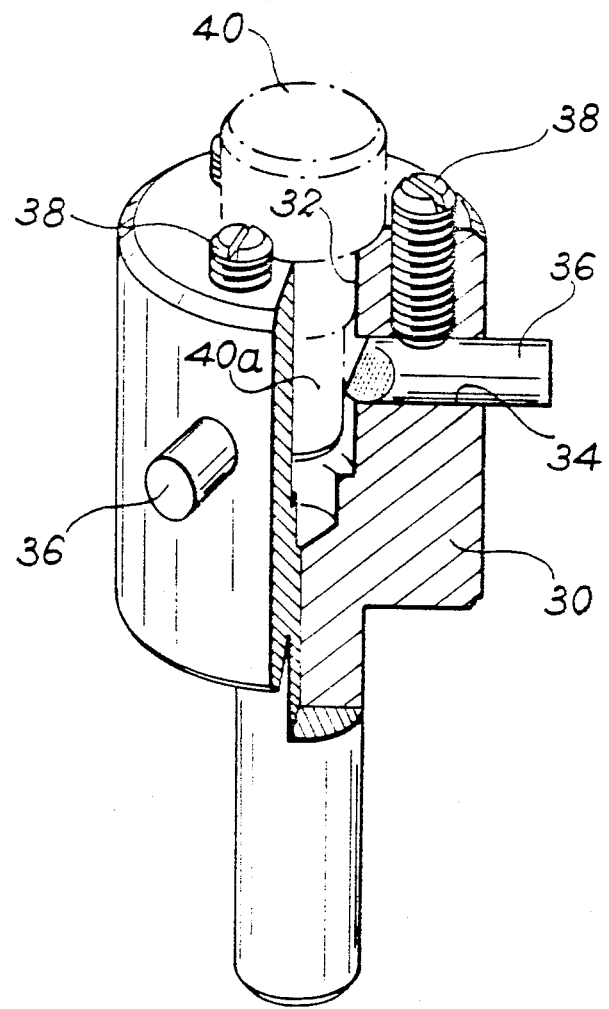
FIG. 3, a perspective and part sectional view of a tool making it possible to produce the serrations on the cylindrical portion of the plug of FIG. 1, a regulating member for said tool being shown in mixed line form.

FIG. 3 shows in exemplified manner a tool making it possible to form the serrations on the surface of the cylindrical plug portion 10. This tool comprises a body 30 having a bore 32 in which is located the cylindrical plug portion.

Three holes 34 are made radially at the same level in body 30 of the tool and issue into bore 32. These holes 34 are distributed at 120° from one another about the axis of body 30 and each of which receives a machining point 36, which is immobilized in the corresponding hole by means of a screw 38. The position of the points 36 is regulated by a member 40 shown in mixed line form in FIG. 3. Member 40 is centered in bore 32 and is provided at its end placed facing points 36 with a portion 40a, whose diameter determines the depth of the serrations to be made in the plug. When regulation or setting is at an end, the points 36 are immobilized by tightening screws 38.

The machining of serrations 20 on plug portion 12 is then carried out by driving the latter into the bore 32 of the tool parallel to the axis of said bore. This operation is followed by finishing on the lathe making it possible to level the ends of the beads 22, so as to eliminate rough edges and calibrate said beads to the desired thickness e.

What is claimed is:

1. A nuclear fuel element comprising a tubular can having an internal diameter between a maximum diameter and a minimum diameter, which is sealed at at least one end by a plug having a cylindrical portion force fitted into said can, wherein the cylindrical portion has a diameter equal to the minimum diameter of the can and has at least three serrations oriented in accordance with the generatrixes of said cylindrical portion and which are regularly spaced, said serrations forming overhanging beads with respect to said cylindrical portion over a thickness equal to half the difference between the maximum diameter and the minimum diameter of the can.

2. A nuclear fuel element according to claim 1, wherein the cylindrical portion of the plug has three serrations.

* * * * *